US005844505A

United States Patent [19]
Van Ryzin

[11] Patent Number: 5,844,505
[45] Date of Patent: Dec. 1, 1998

[54] AUTOMOBILE NAVIGATION SYSTEM

[75] Inventor: John M. Van Ryzin, Madison, N.J.

[73] Assignees: Sony Corporation, Tokyo, Japan; Sony Electronics, Inc., Park Ridge, N.J.

[21] Appl. No.: 825,595

[22] Filed: Apr. 1, 1997

[51] Int. Cl.$^6$ ...................................................... G08G 1/123
[52] U.S. Cl. .......................... 340/988; 340/905; 340/937; 348/148
[58] Field of Search ..................................... 340/905, 936, 340/937, 988, 990, 995; 348/118, 148, 149

[56] References Cited

U.S. PATENT DOCUMENTS

| | | | |
|---|---|---|---|
| 5,043,902 | 8/1991 | Yokoyama et al. | 340/988 |
| 5,146,219 | 9/1992 | Zechnall | 340/905 |
| 5,184,123 | 2/1993 | Bremer et al. | 340/988 |
| 5,204,536 | 4/1993 | Vardi | 250/551 |
| 5,272,638 | 12/1993 | Martin et al. | 340/995 |
| 5,544,060 | 8/1996 | Fujii et al. | 340/995 |
| 5,682,030 | 10/1997 | Kubon | 235/462 |

FOREIGN PATENT DOCUMENTS 2273190  6/1994  United Kingdom ................... 340/905

OTHER PUBLICATIONS

*Electronics International*, "Electronic Navigator Gives Driver Highway Data", Aug. 18, 1977, vol. 50, No. 17, pp. 5E–6E.

*Primary Examiner*—Brent A. Swarthout
*Attorney, Agent, or Firm*—Frommer Lawrence & Haug, LLP; William S. Frommer

[57] ABSTRACT

Automobile navigation system utilizes a wide angle CCD camera that is coupled to the vehicle to receive video images of signs being approached by the vehicle. The user (e.g., the driver) of the system supplies via an input keyboard the desired destination of the vehicle and by using, e.g., a digital compass, the current direction of travel of the vehicle is ascertained. Then, by utilizing a computer system having therein a road database and optical character recognition software, the system converts the video images to road data that identifies the current location of the vehicle, and determines from the current location of the vehicle and the desired destination a desired route of travel. Specific audio directions then are supplied to the driver depending on the vehicle's current location and desired route of travel.

26 Claims, 1 Drawing Sheet

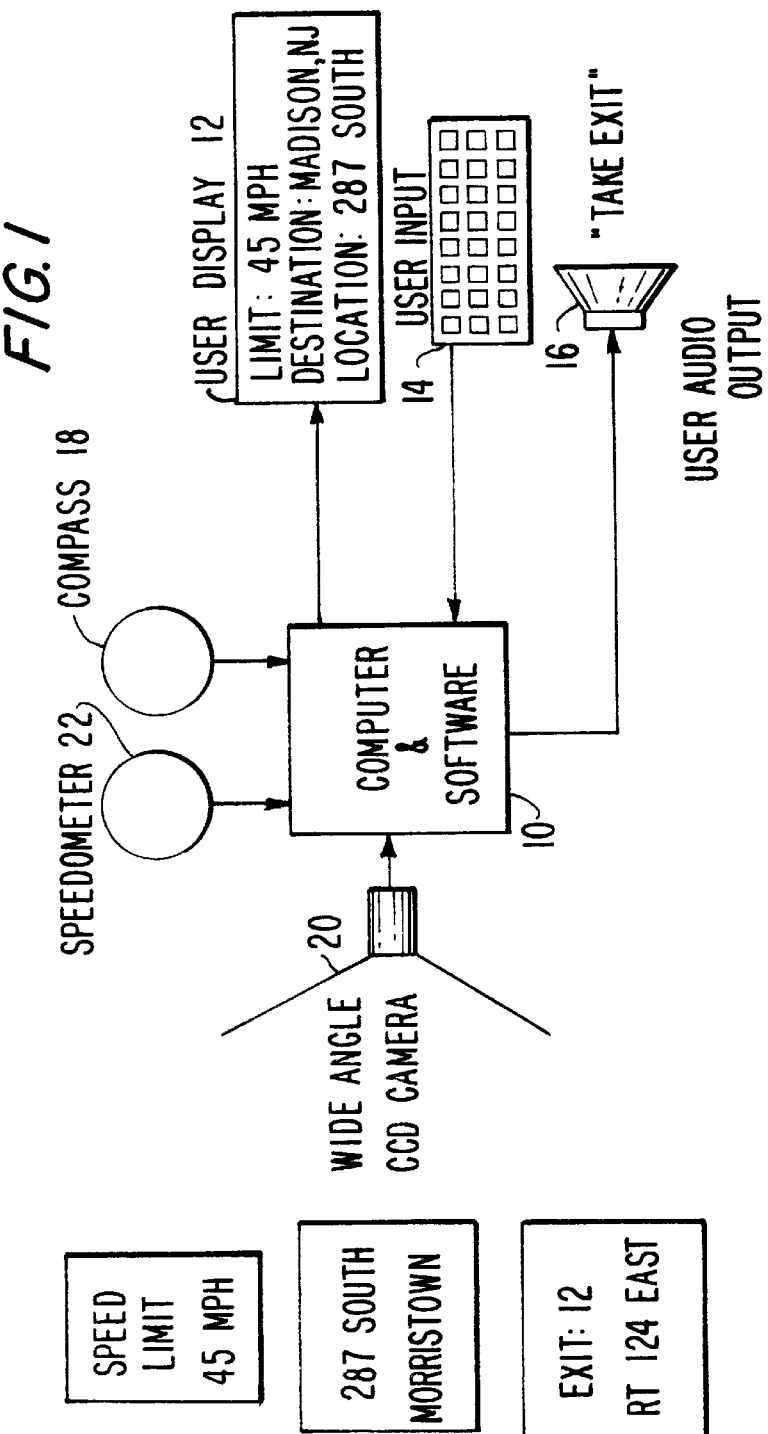

AUTOMOBILE NAVIGATION SYSTEM

BACKGROUND OF THE INVENTION

The present invention relates to an automobile navigation system and, more particularly, to a navigation system designed to provide useful information, including directions and safety instructions to drivers of automobiles and other motor vehicles.

As is known, the use of an automobile requires both the knowledge of one's destination and the ability to arrive at that destination safely.

Throughout the years, there have been a number of safety features that have been added to automobiles in order to reduce the risk of injury to drivers and passengers of motor vehicles as well as to pedestrians. With respect to the knowledge of which streets and highways to take to arrive at one's desired destination, maps are available in assisting one's trip. However, there have been recent developments in automobile navigation systems which are known as global positioning systems (GPS). Unfortunately, such systems are expensive since they require global positioning system hardware, graphical map display hardware, digital compasses and on-board computers.

Another problem with such devices is that they force drivers of automobiles to stop looking at the road so that they may view a graphical display for directions. These so-called distractions result in increased probability for an accident to occur.

OBJECTS OF THE INVENTION

Therefore, it is an object of the present invention to provide an automobile navigation system which overcomes the shortcomings of existing devices.

Another object of the present invention is to provide an automobile navigation system which assists drivers in the navigation of automobiles in a totally safe manner.

A further object of the present invention is to provide an automobile navigation system which operates to increase the safety of driving automobiles while providing navigation instructions to the drivers thereof.

Various other objects, advantages and features of the present invention will become readily apparent to those of ordinary skill in the art, and the novel features will be particularly pointed out in the appended claims.

SUMMARY OF THE INVENTION

In accordance with one embodiment of the present invention, automobile navigation system and corresponding method are provided for receiving (e.g., via a keyboard) a desired destination of the vehicle (e.g., automobile, truck, etc.), receiving from a CCD camera (coupled to the vehicle) video signals that represent road signs being approached by the vehicle, determining a current direction of travel of the vehicle (e.g., by the use of a compass), converting the received video signals to road data that indicate the current location of the vehicle, determining from the current location of the vehicle and the desired destination a desired route of travel of the vehicle, and outputting to a driver of the vehicle audio directions based on the current location of the vehicle, the current direction of travel of the vehicle and the determined desired route of travel.

As one aspect of the present invention, a received video signal that represents a road sign posting a speed limit is identified, and an audio indication of the posted speed limit is supplied to the driver either every time the speed limit is posted or, alternatively, only when the posted speed limit changes.

As another aspect of the present invention, speed data representing the current travelling speed of the vehicle is received (e.g., from the speedometer of the vehicle), a received video signal representing a road sign posting a speed limit is identified, and an audio warning (e.g., "slow down") is given when the current travelling speed of the vehicle is greater than the posted speed limit by a predetermined amount (e.g., 10 mph).

As yet a further aspect of the present invention, video signals representing predesignated road signs (e.g., stop sign, yield sign, toll booth sign) are identified, and audio warnings of the approachment of the predetermined road signals are always supplied or, alternatively, are supplied when the current travelling speed of the vehicle is greater than a predetermined speed (e.g., 30 mph).

As a feature of this aspect, ancillary information (e.g., the amount of money needed to pay an upcoming toll) regarding a road signal is supplied.

As yet another aspect of the present invention, fuel data representing the amount of fuel remaining in the vehicle is received, a received video signal representing a fuel service location is identified, and an audio warning of the approachment of the fuel service location is supplied to the driver when the amount of fuel remaining in the vehicle is below a predetermined amount.

BRIEF DESCRIPTION OF THE DRAWINGS

The following detailed description, given by way of example and not intended to limit the present invention solely thereto, will best be appreciated in conjunction with the accompanying drawings, wherein like references numerals denote like elements and parts, in which:

FIG. 1 is a block diagram of the automobile navigation system of the present invention; and FIGS. 2A–2C are schematic illustrations of exemplary road signs and which are used to explain the operation of the automobile navigation system of the present invention.

DETAILED DESCRIPTION OF CERTAIN PREFERRED EMBODIMENTS

The automobile navigation system of the present invention determines the global position of automobiles, provides audible directions to drivers of the automobiles, and further provides audible safety instructions in certain circumstances. For purposes of the description herein, the term "automobile" is understood to represent any motorized vehicles, including, but not limited to, automobiles, trucks, sport utility vehicles, recreational vehicles, motorcycles, etc.

Referring now to FIG. 1 of the drawings, a block diagram of the automobile navigation system of the present invention is shown. The automobile navigation system includes a computer system 10, which generally includes therein a central processing unit, permanent memory (ROM), temporary memory (RAM) and input/output (I/O) capability. The automobile navigation system further includes a user text display 12, a user input device 14, an audio output device (e.g., a speaker) 16, a digital compass 18, and a wide angle CCD camera 20. In addition, the automobile navigation system receives from the speedometer of the automobile a speed signal identifying the current speed of the automobile. Alternatively, the automobile navigation system may include its own dedicated speedometer which identifies the current speed of the automobile in which the automobile navigation system is installed.

Computer system 10 has stored therein known optical character recognition software and road map data base files. The optical character recognition software converts bit map image data supplied from camera 20 (to be discussed) into recognizable patterns, for example, street signs identifying the streets on which the automobile currently is located.

In accordance with the present invention, wide angle CCD camera 20 is mounted on an appropriate location (either interior or exterior) of an automobile and is capable of imaging areas in front of and to the side of the automobile. CCD camera 20 supplies the imaged areas as a video signal (e.g., as bit map data) to computer system 10 which utilizes the optical character recognition software algorithms therein to convert the supplied video signals into a recognized road sign by utilizing various information within the supplied video signal including the text sign data (i.e., the words printed on the sign), the sign image shape, and the sign image color(s). By using each of these three elements, road signs are distinguished from billboards, store front signs, etc. Computer system 10 then accesses a road map data base therein to determine the current location of the automobile. The road map data base may include data pertaining to road names and numbers, road vectors, highway exits, town/country/state names, as well as any other data that may be useful in the navigation from one location to another. Using the optical character recognition software, the recognized road sign may be a road number, a road name, a town name, a road direction (e.g., north, south, east or west), a mile marker, etc.

Computer system 10 receives from compass 18 a compass heading direction signal identifying the current compass heading of the automobile, such signal being utilized to access the map data base.

Prior to beginning a trip (or even possibly during the trip), a user (e.g., the driver of the automobile) enters the desired destination via user input device 14, which may be in the form of a keyboard. Alternatively, user input device 14 is a microphone or other audio receiver which receives audio information (i.e., spoken information) from the user, such audio information being converted in computer system 10 to destination data indicating the desired destination of the automobile. The user may also supply the current location of the automobile if such information is not readily available to the automobile navigation system, for example, as when the automobile is parked in a garage.

From the current location of the automobile (either user supplied or derived from the video images, as discussed above) and the entered destination, computer system 10 accesses its road map data base to derive one (or more) routes to the destination. One route may represent the quickest route to the destination, while another route may represent the "easiest" route, depending on the needs of the driver (e.g., prefers highways to streets, etc.). Computer system 10 then supplies to user display 12 (e.g., a text display) particular information that is displayed thereon, including, for example, the desired destination, its location in terms of number of miles and direction, and the current speed limit (as shown). The display 12 may provide other information including, but not limited to, the particular route selected. It is noted that while the preferred embodiment includes user display 12, such a display is not necessary to carry out the functions of the automobile navigation system of the present invention, as will be discussed.

Upon beginning the trip, computer system 10 ascertains the automobile's present position using the video data supplied thereto (as previously discussed), and accesses its road map data base to determine whether or not the driver must take some action, other than to remain on the same road in the same direction, to stay "on route" to the desired destination. Thus, the automobile navigation system ascertains all turns and highway exits (and other necessary actions) to take prior to (or, alternatively, during) the trip and as the automobile approaches a turn or highway exit (or other action) that should be taken, computer system 10 supplies to audio output device 16 an appropriate audio instruction that informs the driver of the action to be taken. For example, as the automobile approaches a highway exit that should be taken to remain on route, the audible instruction "take this exit" is supplied to the user. Thus, any and all instructions that the driver needs to arrive at the desired destination by means of the desired route are supplied in the form of audio instructions.

In addition to being able to recognize "street" signs, such as shown in FIGS. 2B and 2C, the automobile navigation system of the present invention further is operable to recognize other signs including, for example, a speed limit sign, such as shown in FIG. 2A of the drawings.

As an aspect of the present invention, computer system 10 supplies an appropriate audio warning to the driver such as, for example, "entering a twenty-five mile per hour area", when the speed limit as posted on the imaged sign indicates "25 mph". Alternatively, speed limit changes may be stored in the road map data base, and when computer system 10 determines that the automobile is in an area having a changed speed limit, an appropriate audio warning can be provided via the audio output or appropriate text can be provided on user display 12.

As a further aspect of the present invention, computer system 10 can utilize the current speed of the automobile, as provided for by the speed signal supplied from speedometer 22, to instruct the driver to "slow down" when the posted speed limit (whether changed or not) is substantially less than (e.g., 10 mph less than) the current speed of the automobile. The user can also predefine the amount at which the audio warning should be given. For example, the user could instruct the automobile navigation system to warn the driver when the speed limit is exceeded by at least ten miles per hour, and if the automobile exceeds the speed limit by at least this amount, the audible instruction "exceeding limit" is provided.

As another feature of the present invention, the automobile navigation system can be programmed by the user to warn the driver of particular signs including, for example, stop signs, yield signs, school zone signs, etc. Appropriate audible instructions may be supplied each time selected signs are approached, or, alternatively, appropriate audible instructions are supplied only when selected signs are approached and the current speed, as indicated by the speed signal supplied from speedometer 22, exceeds predetermined amounts thus indicating that the driver may not be aware of the approaching sign. For example, if the automobile is approaching a stop sign (as imaged by CCD camera 20 or as indicated in the road map data base) and the current speed of the automobile is, e.g., 40 mph, computer system 10 would supply via audio output 16 the audio message "stop sign ahead". Thus, automobile and pedestrian safety are greatly enhanced with such warnings being provided.

In accordance with another embodiment of the present invention, the automobile navigation system is operable to receive from the automobile's fuel gauge, a fuel gauge signal indicating the amount of fuel in the gas tank. In such case, audible warnings can be provided when it is determined that the fuel tank is low. Alternatively, audible warnings (or instructions) that a recognized service area (as imaged by CCD camera 20) is being approached can be provided only when the fuel tank is low. Still further, the presence of service areas can be included in the road map data base, wherein appropriate audible instructions to "fuel up the tank" can be provided when a subsequent service area (after the current one being approached) is relatively far from the current position of the automobile. Thus, the automobile navigation system can be utilized to ensure that the fuel tank of the automobile never becomes empty.

The automobile navigation system of the present invention further is operable to recognize other types of signs in which appropriate driver action may be necessary. For example, the recognition of toll booth signs may be audibly supplied to the driver, as well as the amount of money that is required for the toll. As another example, the recognition of road construction signs can result in audible instructions to "slow down". Of course, other useful information can be audibly supplied to the user, including the amount of estimated travel time and the approximate mileage remaining to reach the desired destination.

From the foregoing discussion, it is seen that the automobile navigation system of the present invention operates to ascertain a desired route to a selected destination, to provide audible destination instructions to the driver so that the automobile may reach the desired destination without the use of, for example, a map, to provide cautionary instructions to maximize driver, passenger and pedestrian safety, and to provide other types of information that are designed to make the trip more enjoyable, safer and problem free (or, at least, minimizes possible problems) to the user.

While the present invention has been particularly shown and described in conjunction with preferred embodiments thereof, it will be readily appreciated by those of ordinary skill in the art that various changes may be made without departing from the spirit and scope of the invention.

Therefore, it is intended that the appended claims be interpreted as including the embodiments described herein, the alternatives mentioned above, and all equivalents thereto.

What is claimed is:

1. Automobile navigation system, comprising:
    means for receiving video signals representing standard road signs being approached by a vehicle;
    means for determining a current direction of travel of said vehicle;
    means for receiving a desired destination of said vehicle;
    audio output means for outputting audio messages to a driver of said vehicle; and
    control means for converting predetermines ones of said video signals to road data indicating a current location of said vehicle based on information including at least one of road sign text, color or shape; for determining from said current location of said vehicle and said desired destination a desired route of travel of said vehicle; and for controlling said audio output means to output to said driver audio directions based on the current location of said vehicle, the current direction of travel of said vehicle and the determined desired route of travel.

2. The automobile navigation system of claim 1, wherein said control means includes means for determining if an upcoming action is to be taken by said driver of said vehicle based on the current location of said vehicle, the current direction of travel of said vehicle and the determined desired route of travel; and for controlling said audio output means to output to said driver an audio instruction corresponding to the upcoming action to be taken.

3. The automobile navigation system of claim 1, wherein said means for receiving video signals is comprised of a CCD camera coupled to said vehicle for imaging signs being approached by said vehicle and for converting said imaged signs to said video signals.

4. The automobile navigation system of claim 1, wherein said control means is operable to identify a video signal representing a road sign posting a speed limit and to control said audio output means to output to said driver an audio indication of the posted speed limit.

5. The automobile navigation system of claim 1, wherein said control means is operable to identify a video signal representing a road sign posting a speed limit and to control said audio output means to output to said driver an audio speed limit change warning when the posted speed limit changes.

6. The automobile navigation system of claim 1, further comprising means for receiving speed data representing a current travelling speed of said vehicle; and wherein said control means is operable to identify a video signal representing a road sign posting a speed limit, and to control said audio output means to output to said driver an audio warning when the current travelling speed of said vehicle is greater than the posted speed limit by a predetermined amount.

7. The automobile navigation system of claim 6, wherein said control means is further operable to control said audio output means to output to said driver said audio warning when the current travelling speed of said vehicle is greater by a predetermined amount than a last posted speed limit represented by a previously received video signal.

8. The automobile navigation system of claim 6, wherein said audio warning is an audio instruction to slow down.

9. The automobile navigation system of claim 1, wherein said control means is operable to identify video signals representing predetermined road signs, and to control said audio output means to output to said driver audio warnings of the approachment of said predetermined road signs.

10. The automobile navigation system of claim 9, wherein said control means is further operable to control said audio output means to output to said driver ancillary information regarding selected ones of said predetermined road signs being approached.

11. The automobile navigation system of claim 10, wherein said control means controls said audio output means to output audio information indicating an amount of money needed for an approaching toll.

12. The automobile navigation system of claim 1, further comprising means for receiving speed data representing a current travelling speed of said vehicle; and wherein said control means is operable to identify video signals representing predetermined selected road signs, and to control said audio output means to output to said driver audio warnings of the approachment of said predetermined road signals when the current travelling speed of said vehicle is greater than a predetermined speed.

13. The automobile navigation system of claim 1, further comprising means for receiving fuel data representing an amount of fuel remaining in said vehicle; and wherein said control means is operable to identify a video signal representing a fuel service location, and to control said audio output means to output to said driver an audio warning of the approachment of said fuel service location when the amount of fuel remaining in said vehicle is below a predetermined amount.

14. Method of navigating a vehicle, comprising the steps of:

receiving a desired destination of a vehicle;

receiving video signals representing standard road signs being approached by said vehicle;

determining a current direction of travel of said vehicle;

converting predetermines ones of the received video signals to road data indicating a current location of said vehicle based on information including at least one of road sign text, color or shape;

determining from said current location of said vehicle and said desired destination a desired route of travel of said vehicle; and outputting to a driver of said vehicle audio directions based on the current location of said vehicle, the current direction of travel of said vehicle and the determined desired route of travel.

15. The method of claim 14, wherein said step of outputting is carried out by determining an upcoming action to be taken by a driver of said vehicle based on the current location of said vehicle, the current direction of travel of said vehicle and the determined desired route of travel, and by outputting to said driver an audio instruction corresponding to the upcoming action to be taken.

16. The method of claim 14, wherein said step of receiving video signals includes the steps of imaging signs being approached by said vehicle by a CCD camera coupled to said vehicle and converting said imaged signs to said video signals.

17. The method of claim 14, further comprising the steps of identifying a received video signal representing a road sign posting a speed limit; and outputting to said driver an audio indication of the posted speed limit.

18. The method of claim 14, further comprising the steps of identifying a received video signal representing a road sign posting a speed limit; and outputting to said driver an audio speed limit change warning when the posted speed limit changes.

19. The method of claim 14, further comprising the steps of receiving speed data representing a current travelling speed of said vehicle; identifying a received video signal representing a road sign posting a speed limit; and outputting to said driver an audio warning when the current travelling speed of said vehicle is greater than the posted speed limit by a predetermined amount.

20. The method of claim 19, wherein said step of outputting to said driver an audio warning is carried out also when the current travelling speed of said vehicle is greater by a predetermined amount than a last posted speed limit represented by a previously received video signal.

21. The method of claim 19, wherein said audio warning is an audio instruction to slow down.

22. The method of claim 14, further comprising the steps of identifying received video signals representing predetermined road signs; and outputting to said driver audio warnings of the approachment of said predetermined road signs.

23. The method of claim 22, further comprising the step of outputting to said driver ancillary information regarding selected ones of said predetermined road signs being approached.

24. The method of claim 23, wherein said step of outputting ancillary information is carried out by indicating an amount of money needed for an approaching toll.

25. The method of claim 14, further comprising the steps of receiving speed data representing a current travelling speed of said vehicle; identifying received video signals representing predetermined selected road signs; and outputting to said driver audio warnings of the approachment of said predetermined road signals when the current travelling speed of said vehicle is greater than a predetermined speed.

26. The method of claim 14, further comprising the steps of receiving fuel data representing an amount of fuel remaining in said vehicle; identifying a received video signal representing a fuel service location; and outputting to said driver an audio warning of the approachment of said fuel service location when the amount of fuel remaining in said vehicle is below a predetermined amount.

\* \* \* \* \*